D. J. ERWIN.
HARROW ATTACHMENT.
APPLICATION FILED JUNE 24, 1920.
1,402,586. Patented Jan. 3, 1922.
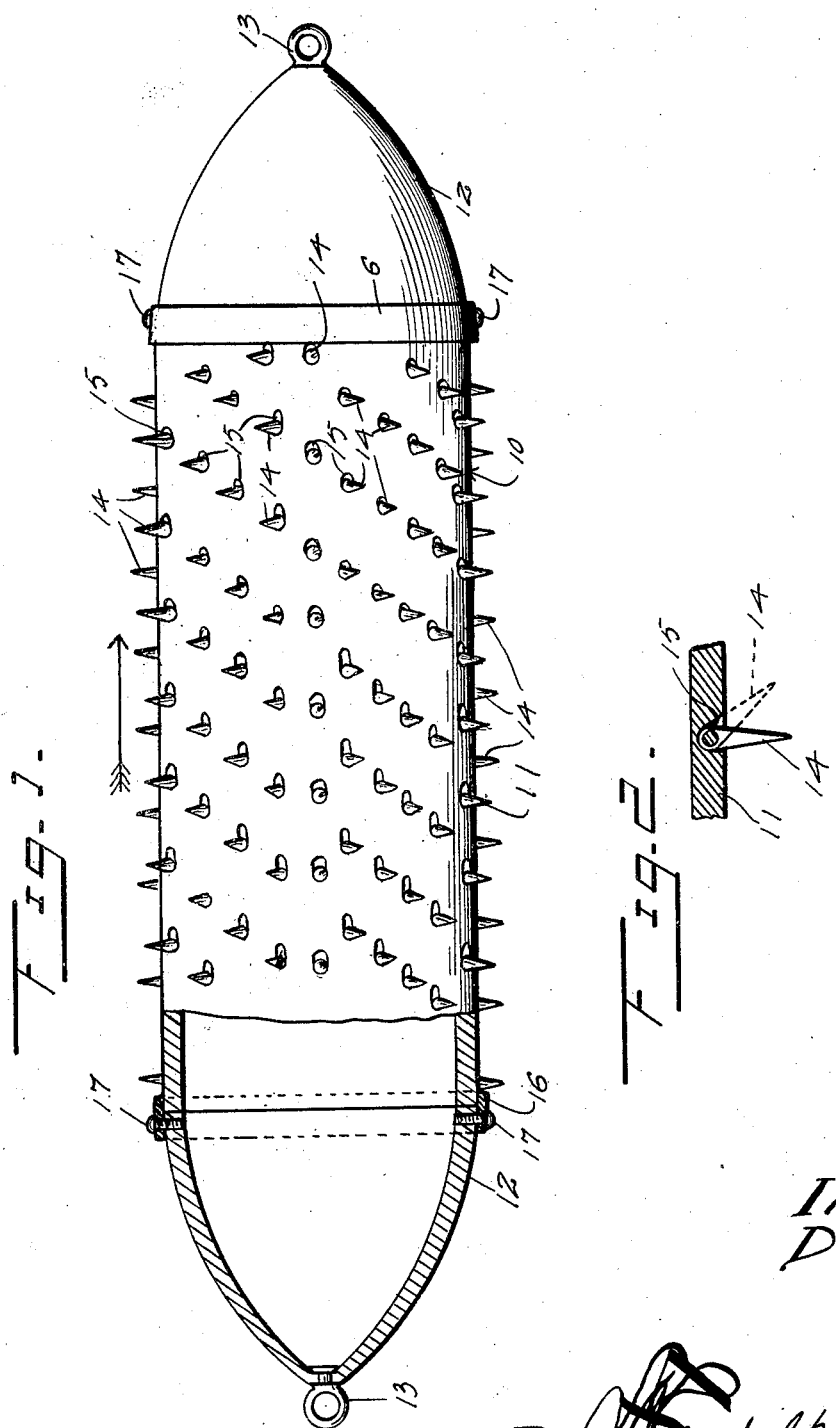
Inventor
D. J. Erwin

UNITED STATES PATENT OFFICE.

DAVID JOSHUA ERWIN, OF LAWRENCE, NEBRASKA.

HARROW ATTACHMENT.

1,402,586.

Specification of Letters Patent.  Patented Jan. 3, 1922.

Application filed June 24, 1920. Serial No. 391,488.

*To all whom it may concern:*

Be it known that I, DAVID JOSHUA ERWIN, a citizen of the United States, residing at Lawrence, in the county of Nuckolls and State of Nebraska, have invented certain new and useful Improvements in Harrow Attachments; and I do hereby declare the following to be a full, clear, and exact description of the invention, such as will enable others skilled in the art to which it appertains to make and use the same.

The object of the invention is to provide a soil pulverizing attachment for a harrow designed as a means for supplementing the action of the harrow teeth or of being used independently thereof according to the requirement of the soil to be treated and adapted by its construction to roll laterally to accomplish the effective crushing and pulverizing of the soil, and a further object is to provide such a construction of the device as to adapt it to be reversed to vary the effect upon the soil to suit the condition of the latter; and with these objects in view the invention consists in a construction and combination of parts of which a preferred embodiment is illustrated in the accompanying drawing, wherein:

Figure 1 is a side view of the attachment.

Figure 2 is a detail sectional view of a portion of the same to show the mounting of the teeth designed for engagement with the surface of the soil.

The device consists essentially of a roller 10 having a cylindrical body portion 11 and conical end portions 12 at the apex of each of which is arranged a swivel draft eye 13, to the end that the attachment may be hitched to a draft appliance with either end forward and moved longitudinally or axially on the surface of the soil, with freedom to roll laterally in the crushing and pulverization of the same.

The cylindrical portion of the device carries a plurality of teeth or spurs 14 which are pivotally mounted in seats 15 formed in the surface thereof, the pivotal movement of said teeth or spurs being limited in one direction to a position perpendicular to the surface of the cylinder or radial with reference thereto, and being limited in the other direction to a position at an inclination to the surface of the cylinder or at an angle to the axis of the same. In other words the teeth or spurs are pivotally mounted for arrangement either in radial or inclined relation to the axis or axial center of the cylinder and are positioned in one relation or the other according to whether the device is moved in one direction or the other, or in other words whether the draft appliance is connected with one terminal thereof or the other. It will be seen that if the cylinder is drawn for example in the direction indicated by the arrow in Figure 1 the teeth or spurs will swing outward to a position which is radial in relation to the axis of the cylinder whereas if the device is moved in a direction opposite to that indicated by the arrow the teeth or spurs will fold partly to assume a position at an acute angle to the axis of the cylinder. Obviously the different positions of the teeth or spurs will involve a different or a modified action upon the soil traversed thereby, and the inclined arrangement of the teeth or spurs is particularly desirable when the apparatus is being moved over a surface which is more or less obstructed by weeds, grass or loose fibrous substances.

A band 16 surrounds and is secured to each end of the body portion 11. These bands project beyond the ends of the body portion 11 and they receive the inner ends of the end portions 12. The end portions are secured in place by screws 17 which pass through the band 16 and enter the end portions, as clearly shown in the drawing.

Having thus described my invention, what I claim is:—

1. A harrow attachment having a body portion composed of a cylinder with teeth arranged around the entire surface of the cylinder, and a means for attaching said body to a draft appliance.

2. A harrow attachment having a cylindrical body portion and terminal draft applying means, said cylindrical surface being provided with pivotal teeth or spurs variable in position longitudinally of the cylinder to occupy positions respectively in radial and acute angular relation with the axis thereof.

3. A harrow attachment having a cylindrical body portion provided with terminal conical portions and draft applying means at the apexes of the conical portions, the cylindrical surface of the device being provided with pivotal teeth or spurs terminally movable by the direction of longitudinal movement of the cylinder to occupy positions respectively in radial and in acute angular relation with the axis thereof.

In testimony whereof, I affix my signature in presence of two witnesses.

DAVID JOSHUA ERWIN.

Witnesses:
  C. F. GUND,
  L. M. KLEBER.